(12) United States Patent
Yarvis

(10) Patent No.: US 9,332,381 B2
(45) Date of Patent: May 3, 2016

(54) LOCATION-BASED APPLICATION RECOMMENDATION

(75) Inventor: Mark D. Yarvis, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/977,051

(22) PCT Filed: Mar. 24, 2012

(86) PCT No.: PCT/US2012/030483
§ 371 (c)(1),
(2), (4) Date: Mar. 21, 2014

(87) PCT Pub. No.: WO2013/147725
PCT Pub. Date: Oct. 3, 2013

(65) Prior Publication Data
US 2014/0194146 A1    Jul. 10, 2014

(51) Int. Cl.
H04W 4/00 (2009.01)
H04W 4/02 (2009.01)
G06Q 10/00 (2012.01)
G06Q 30/02 (2012.01)

(52) U.S. Cl.
CPC ............... *H04W 4/02* (2013.01); *G06Q 10/00* (2013.01); *G06Q 30/0282* (2013.01); *H04W 4/028* (2013.01)

(58) Field of Classification Search
CPC ....... H04W 4/02; H04W 64/00; H04W 4/028; H04W 4/22; H04W 76/007; G06F 17/30053
See application file for complete search history.

(56) References Cited

U.S. PATENT DOCUMENTS

| | | | |
|---|---|---|---|
| 6,647,257 B2* | 11/2003 | Owensby | 455/414.1 |
| 7,974,637 B1* | 7/2011 | Taveniku | 455/456.1 |
| 8,364,117 B2* | 1/2013 | Hawkins | 455/404.2 |
| 2004/0203863 A1 | 10/2004 | Huomo | |
| 2008/0248815 A1* | 10/2008 | Busch | 455/456.5 |
| 2009/0209267 A1 | 8/2009 | Jagetiya | |
| 2011/0159890 A1 | 6/2011 | Fortescue et al. | |
| 2011/0307478 A1* | 12/2011 | Pinckney et al. | 707/724 |
| 2013/0339345 A1* | 12/2013 | Soto Matamala et al. | 707/722 |
| 2014/0229465 A1* | 8/2014 | Rose | 707/722 |

FOREIGN PATENT DOCUMENTS

| | | |
|---|---|---|
| EP | 2 410 482 A1 | 1/2012 |
| KR | 10-2012-0009834 A | 2/2012 |
| WO | 2013/147725 A1 | 10/2013 |

OTHER PUBLICATIONS

International Preliminary Report on Patentability and Written Opinion received for PCT Patent Application No. PCT/US2012/030483, mailed on Oct. 9, 2014, 7 pages.

(Continued)

*Primary Examiner* — Diane Mizrahi
(74) *Attorney, Agent, or Firm* — Forefront IP Lawgroup PLLC

(57) ABSTRACT

Described herein are techniques related to location-aware application recommendations in wireless devices. For example, an application recommendation alert may be displayed at the wireless device based on a current location, time, and data of the wireless device. Further, relevant applications to user location based on where the wireless device that are placed for sale at the market may be displayed at the wireless device.

30 Claims, 6 Drawing Sheets

Notification screen for location-aware application recommendations

(56) References Cited

OTHER PUBLICATIONS

International Search Report and Written Opinion received for PCT Patent Application No. PCT/US2012/030483, mailed on Nov. 28, 2012, 10 pages.

Office Action received for Korean Patent Application No. 10-2014-7025724, mailed on Oct. 20, 2015, 4 pages Of Korean Office Action only.

Extended European Search Report received for European Patent Application No. 12873180.9, mailed on Sep. 25, 2015, 7 pages.

* cited by examiner

Notification screen for location-aware application recommendations

LOCATION-BASED APPLICATION RECOMMENDATION

BACKGROUND

Wireless digital multimedia content, such as applications, is rapidly becoming a source for obtaining news and current events, for downloading and playing games, to watch sports, to watch movies, and the like. On the other hand, consumers of the wireless digital multimedia in a wireless device may face an increasing array of digital multimedia content to consume. Most of the digital multimedia content (applications) may not include content of interest to the consumer, such as when the digital multimedia is not related to a particular time and current location of the consumer. For example, when reading a particular content, different digital multimedia may be displayed or will pop-up even though the digital multimedia has no relation to the current location of the consumer. Furthermore, due to limited screen space of the wireless device and user input functionality, the digital multimedia content not of interest to the consumer may cause to the consumer.

BRIEF DESCRIPTION OF TILE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are techniques related to location-aware application recommendations in a wireless device. In one embodiment, a physical location module may determine a current location, time, and date of the wireless device. The current location, time and date may be supplied to a matching ruleset module that compares at least one application that is relevant to the current location, time, and date. In an implementation, the matching ruleset supplies a recommendation alert module and an application market place module to provide a user a notification alert, or an option to buy relevant applications that are placed on the market by independent software vendors (ISVs).

Example Recommendations for Wireless Device

Figure 1A:
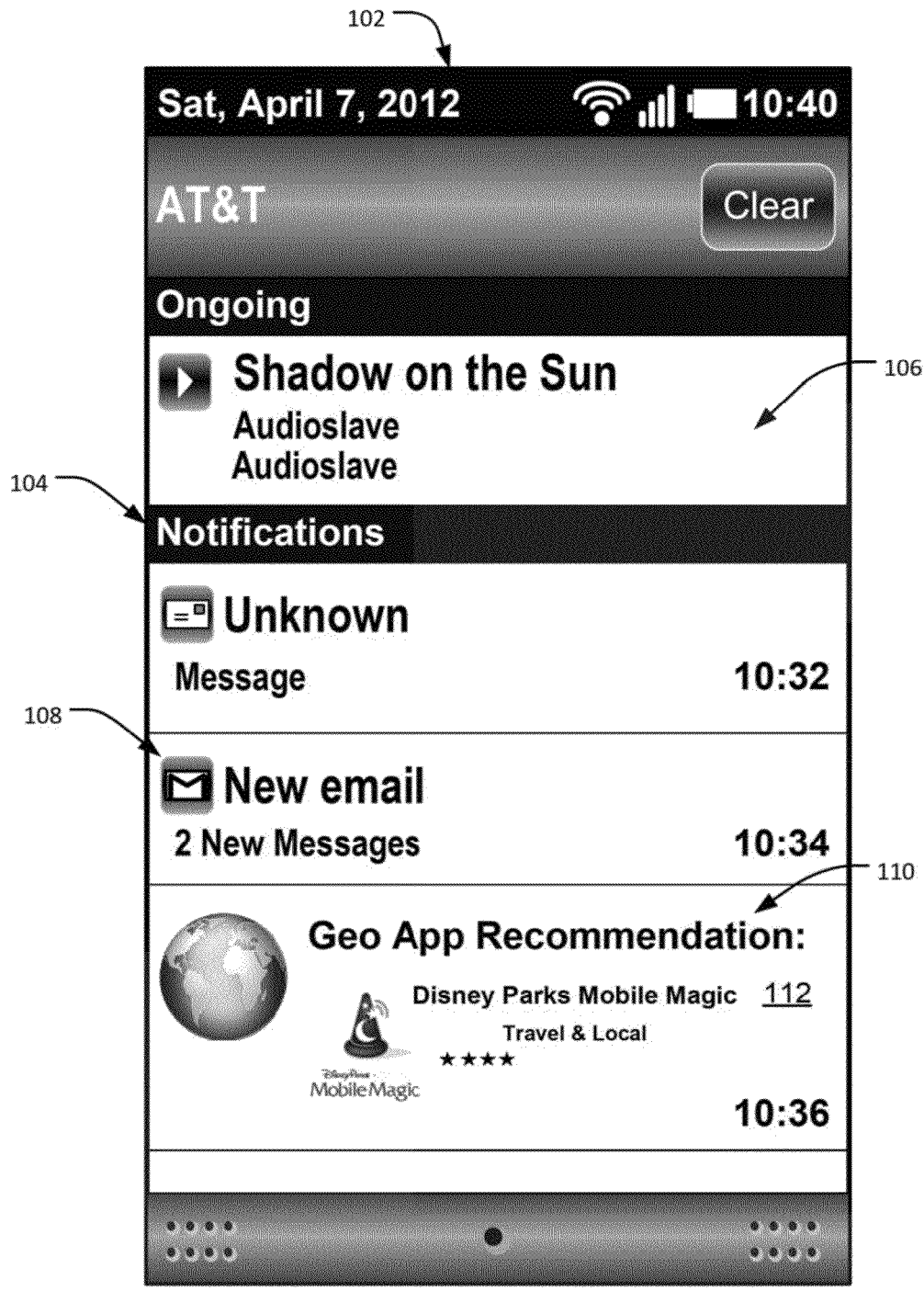
FIG. 1A illustrates a wireless device screen that shows notification screen for location-aware application recommendations.

FIG. 1A illustrates a notification screen for location-aware application recommendations in a wireless device. In one embodiment, a wireless device 102 may be connected to a server management device (not shown) through a network (not shown). The wireless device 102 includes (but is not limited to) mobile phone, a cellular phone, a Smartphone, a personal digital assistant, a tablet computer, a netbook, a notebook computer, a laptop computer, a multimedia playback device, a digital music player, a digital video player, a navigational device, a digital camera, or the like, both physical and virtual. The wireless device 102 may be capable of transmitting, receiving, processing, and/or displaying digital multimedia. For example, the digital multimedia may include notifications 104 that may be displayed at a screen 106 of the wireless device 102. In an implementation, the notifications 104 may include new email messages 108, geographical application recommendation 110, and the like. In this implementation, the geographical application recommendation 110 may include at least one or more applications that may be discovered to be relevant to a place where a user (not shown) of the wireless device 102 is currently located, or frequently visits (e.g., Disney™ Parks Mobile Magic™ 112 application if the user is currently located in a Disney™ Park). In an implementation, the server management device (not shown) may be any server computing device, including a virtualized server, cloud server, or the like. The server management device may be connected and/or accessible to the wireless device 102 through the network (not shown) that may include a wireless network, a local access network, a metropolitan area network, an IP network, and/or the like.

Figure 1B:
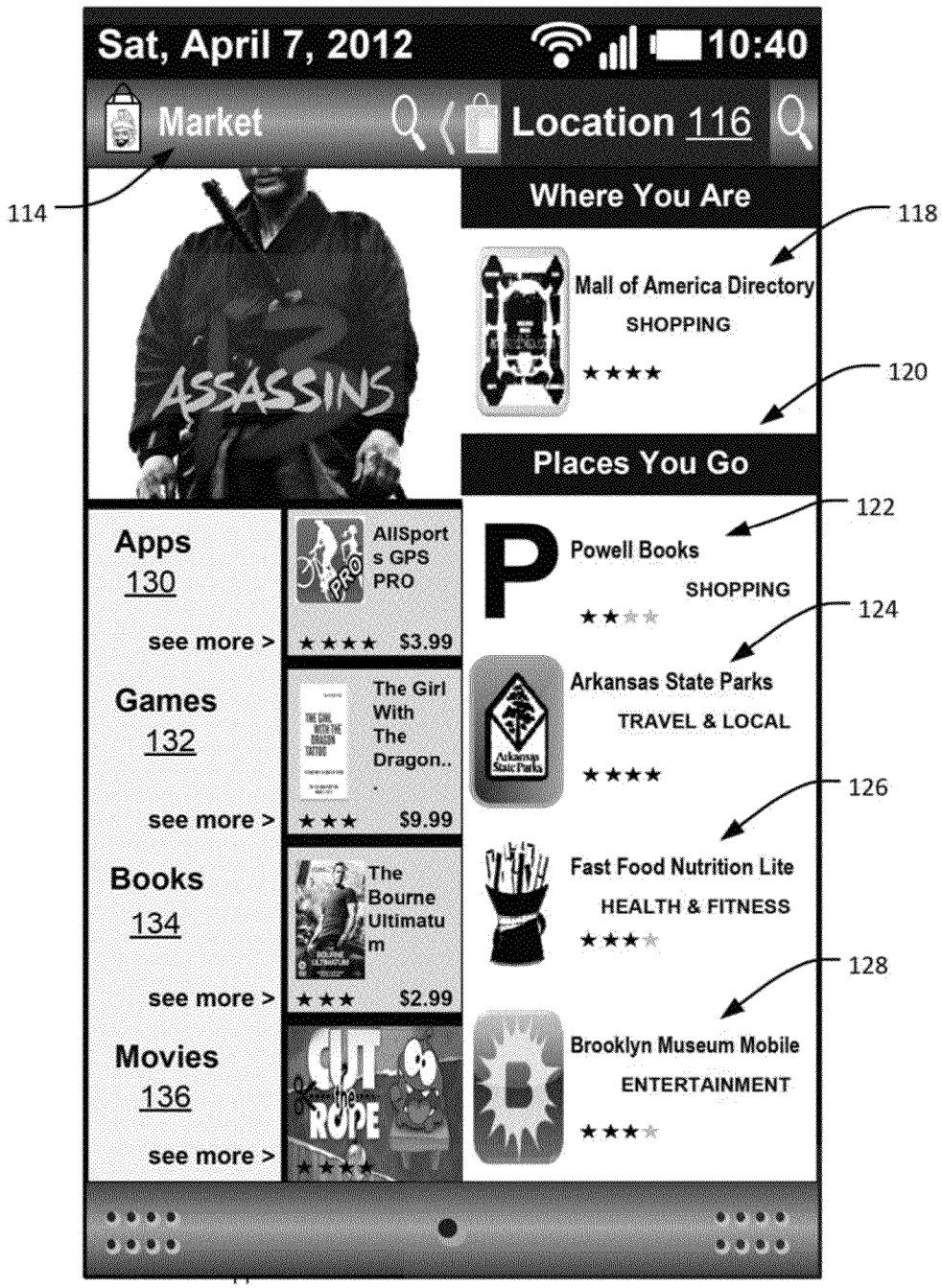
FIG. 1B illustrates a wireless device screen that shows an application store with location-aware recommendations.

FIG. 1B illustrates another digital multimedia display that shows an application store with location-aware recommendations in the wireless device 102. In an implementation, the notifications 104 may take the form of an application store such as, application market place 114. The application market place 114 may be configured to identify a current location (i.e., displayed in present location panel 116) of the user for the wireless device 102. For example, when a user's present location is in a particular shopping mall, a Mall of America™ Directory application 118 that is relevant to the particular shopping mall may be recommended to the user. In an implementation, a "places you go" panel 120 may recommend applications that the user has visited a number of times in the past. For example, the Powell Books™ application 122 is recommended based on a visit to Powell Books™, the Arkansas State Parks application 124 is recommended based on a visit to a state park, the Fast Food Nutrition Life™ application 126 is recommended based on a visit to a fast food restaurant, and the Brooklyn Museum™ Mobile application 128 is recommended based on a museum visit. In this implementation, the "places you go" panel 120 may recommend the applications that may be relevant to the current location of the user, and the user's history of visitations in the past.

In an implementation, the application market place 114 may include recommending applications 130, games applications, 132, books applications 134, movies applications 136, and the like that may correspond to where the user is currently located.

Service Architecture

Figure 2:
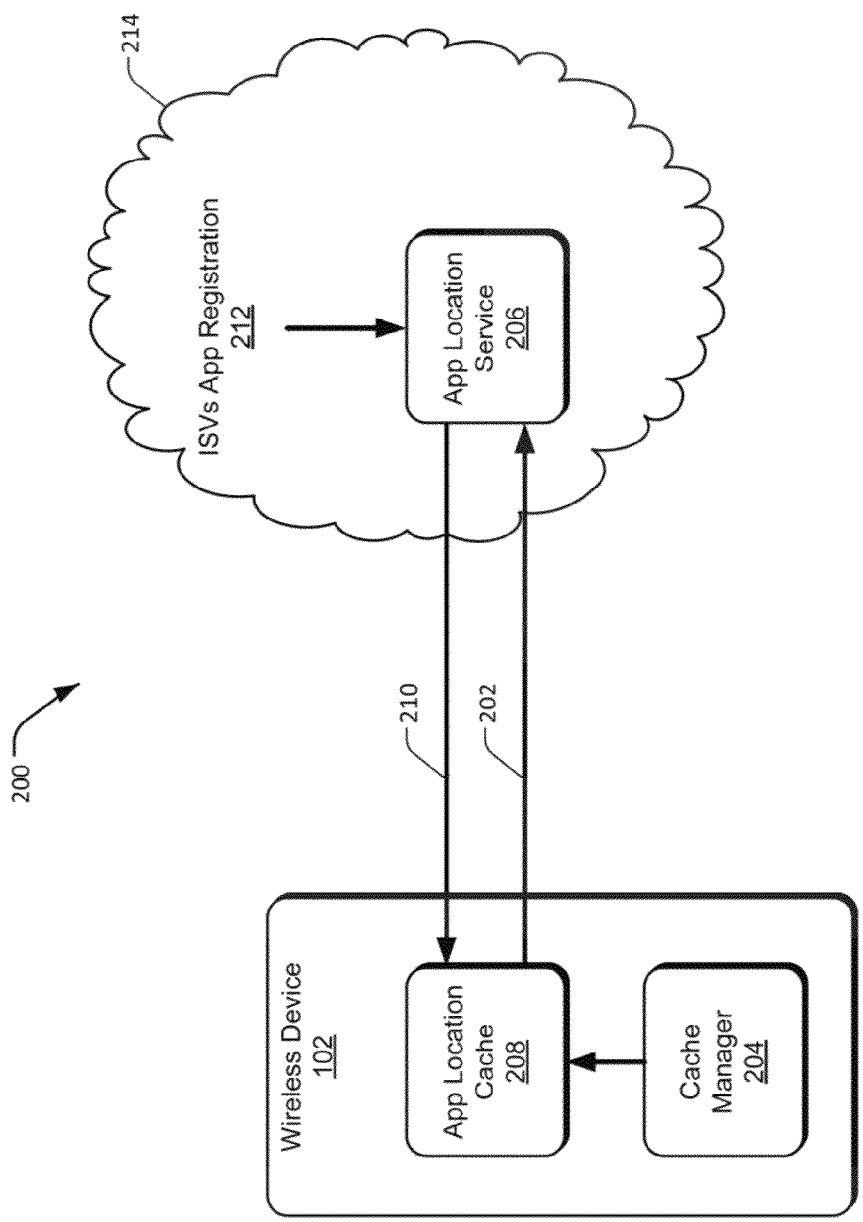
FIG. 2 illustrates a diagram showing a high level view of a service architecture 200 that implements location-based application recommendation.

FIG. 2 illustrates a high level view of a service architecture 200 that implements location-based application recommendation. In an implementation, the service architecture 200 may include two main features. A first feature may include a query mechanism such as, a query 202 that may be utilized by a cache manager module 204 at the wireless device 102. The query 202 may be used to obtain information regarding at least one or more applications that are relevant within a specific geographic area where the user (not shown) of the wireless device 102 is currently located or a general area where the user typically visits (e.g., the user's city or state). For example, the user is currently located within the geographical area that is defined by a circle or a polygon using global positioning system (GPS) coordinates. A second feature may include an application location service 206 that may transmit the at least one or more applications, in response to the query 202, to an application location cache 208 through a response 210.

In an implementation, the one or more applications may be supplied by ISVs through ISVs application registration 212, and stored at the application location service 206. In an implementation, the application location service 206 may be located at cloud 214 when interacting with the wireless device 102. During ISV Application Registration 212, the at least one or more applications are associated with a specific geographic region. For example, an ISV representing the owner of an amusement park may register an application that helps users determine the line lengths of rides in the amusement park. The application may then be associated with the geographic location of the amusement park. The Application Location Service 206 stores the geographic location associated with the application and either the application itself or a reference pointing to where the application may be obtained. The entries stored in the Application Location Service 206 are then matched to each query 202, if they are within the requested region, and returned to the Application Location Cache 208.

In one embodiment, a mapping between the at least one or more applications and the geographical area may be time limited. In other words, the mapping may be useful if the at least one or more applications may be related to an event that is occurring within a time period at a given location, rather than the location itself. For example, Cirque de Soleil™ may have an application and the application is associated with the current location of their tent. In this example, the application location service 206 may store a time frame such as, a particular time and date, in addition to location of current operation of the Cirque de Soleil™. The application location service 206 may transmit the at least one or more applications of the Cirque de Soleil™, which may correspond to a given entry that includes the current time, date, and location for the wireless device 102. The at least one or more applications may be received by the application location cache 208 during the active time period corresponding to the time, date, and location of operation for the Cirque de Soleil™.

In one embodiment, the service architecture 200 may implement a Web Application (not shown) that the ISVs may use to register their applications. For example, at the ISVs application registration 212, the ISVs may provide a description of their applications (e.g., applications 116, books applications 118, games applications 120, etc.), a link to where the applications may be purchased, the relevant geographic information, and time frame as described above. In an implementation, the service architecture 200 may represent a revenue-generating opportunity. For example, access controls may be configured in place for both the ISVs application registration 212 and the query 202 interfaces, requiring payment by the ISVs to register their applications, or by the user(s) to obtain the application/location mappings. Event promoters may pay to associate applications with locations during the course of an event (e.g., time period for Cirque de Soleil™). In another example, the revenue may be generated from the ISVs when the users choose to install the applications that have been recommended based on this service (i.e., location-aware application recommendations).

Wireless Device Architecture

Figure 3:
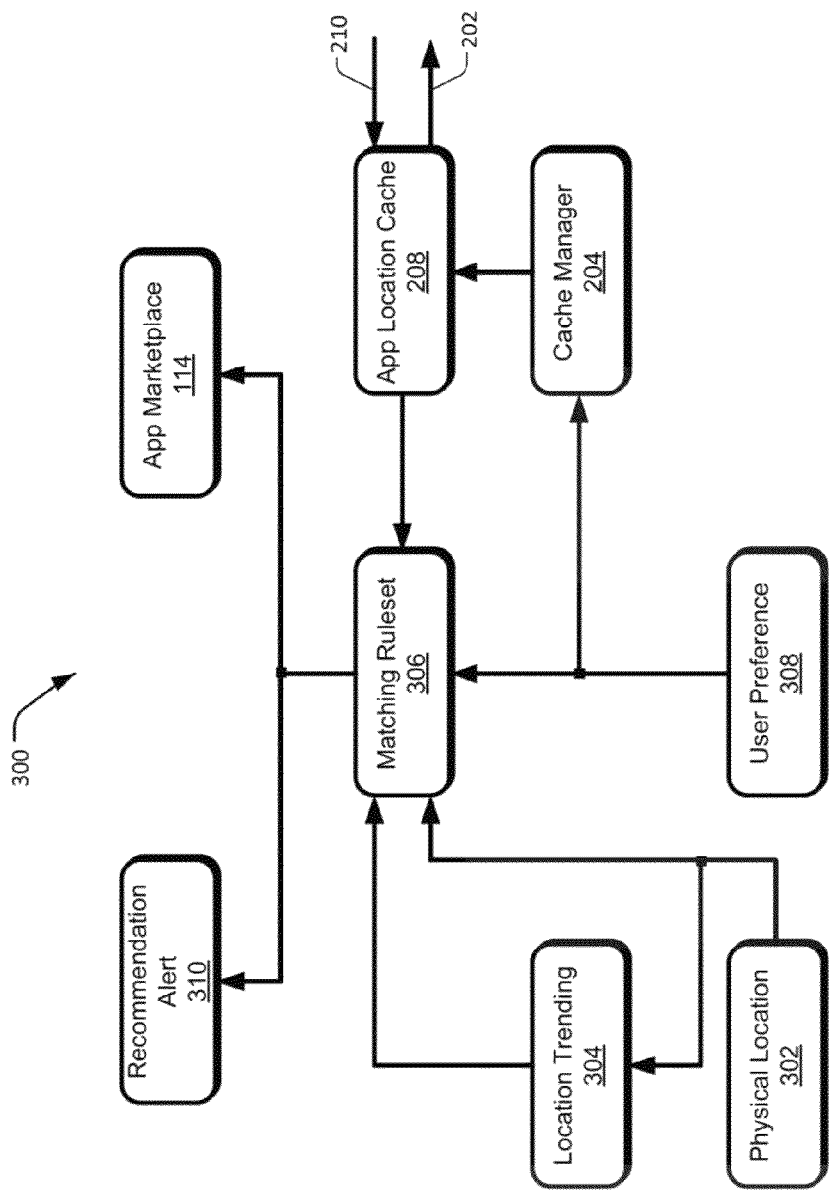
FIG. 3 illustrates a diagram showing an architecture 300 for a wireless device to enable location-aware application recommendation.

FIG. 3 illustrates architecture 300 for the wireless device 102 to enable location-aware application recommendation. In an implementation, a wireless device 102 user's current location may be tracked by a physical location module 302. The physical location module 302 may be configured to determine the current location through a GPS, a nearest cell tower, WiFi localization, or similar technologies. Further, the physical location module 302 may be configured to identify time and date that are associated to determination of the current location for the wireless device 102. In one embodiment, the current location over time may be tracked by a location trending module 304 that is configured to track and store the number of times that the user has visited various locations. Further, the associated time(s) and date(s) for the recorded visitations to the various locations may be stored by the location trending module 304. For example, to enable the tracking or counting the number of visits to the certain location, the location trending module 304 may cluster a stream of discrete locations into dusters of meaningful locations such as, where the user spent significant time within a small area. To this end, the current location, the time and the date may be defined by the physical location module 302, and the historical location information may be identified by the location trending module 304. In an implementation, the current location, time, date, and the historical location information may be fed to a matching ruleset 306.

In one embodiment, a platform for the service architecture 300 may include a cache of applications that are received through the link 210 from the application location service 206. The cache of applications and its corresponding time, and locations may be stored at the application location cache 208. Each application in the cache of applications may be associated with one or inure geographic locations that may be represented by a point, a circle, or polygon that is defined by the GPS coordinates. In an implementation, the application location cache 208 may be updated by the cache manager 204 that queries (e.g., query 202) a service in the cloud 214 for the application(s) that may correspond to a given geographic area. For example, the size of the geographic area may be determined by a "location privacy" parameter entered by the user through user preference module 308. In this example, the user may balance between privacy and storage space on the application location cache 208. The "location privacy" may enable a very large area around the user's typical roaming area may be chosen (e.g., within 100 miles) to preserve privacy. On the other hand, the user who has lower privacy concerns may choose to cache entries for applications that are closer to the user's normal roaming area (e.g., within 10 miles).

In an implementation, the application location cache 208 may store and/or supply a list of the applications that are relevant to the time, geographical area, and the historical location information supplied by the physical location module 302 and the location trending module 304. In one embodiment, the matching ruleset 306 may be used to search for the relevant applications that may correspond to the time, date, and geographical area inputs from the physical location module 302. Further, the matching ruleset may be configured to search for the relevant applications that may correspond to the historical location information input from the location trending module 304. In another embodiment, the matching ruleset 306 may be configured to provide a query interface for the user. For example, the user who is currently at a location of interest may query for a list of applications that are relevant to the location of interest. Further, the matching ruleset 306 may be configured to trigger a recommendation alert 310 such as, a geo application recommendation 110 in FIG. 1 when the user is at a location that matches an application in the application location cache 208.

In an implementation, adjustment of "user sensitivity" at the user preference 308 may allow the user to choose how many times he has to visit the same location before the recommendation alert 310 may be triggered. For example, since an application may be associated with at least two or more physical locations, the sum of matches between the at least two or more physical locations may represent the total number of historical visits that will be stored at the location trending module 304. In this example, the matching ruleset 306 may feed a list of relevant applications to an application marketplace 114 that displays the relevant applications that may correspond to the user's current location and historical location information. Accordingly, the user may be presented with a list of applications that are relevant to his location or location history, and a user interface may provide a "one-click" installation experience to allow the application to be installed as part of the recommendation experience.

Example Process

Figure 4:
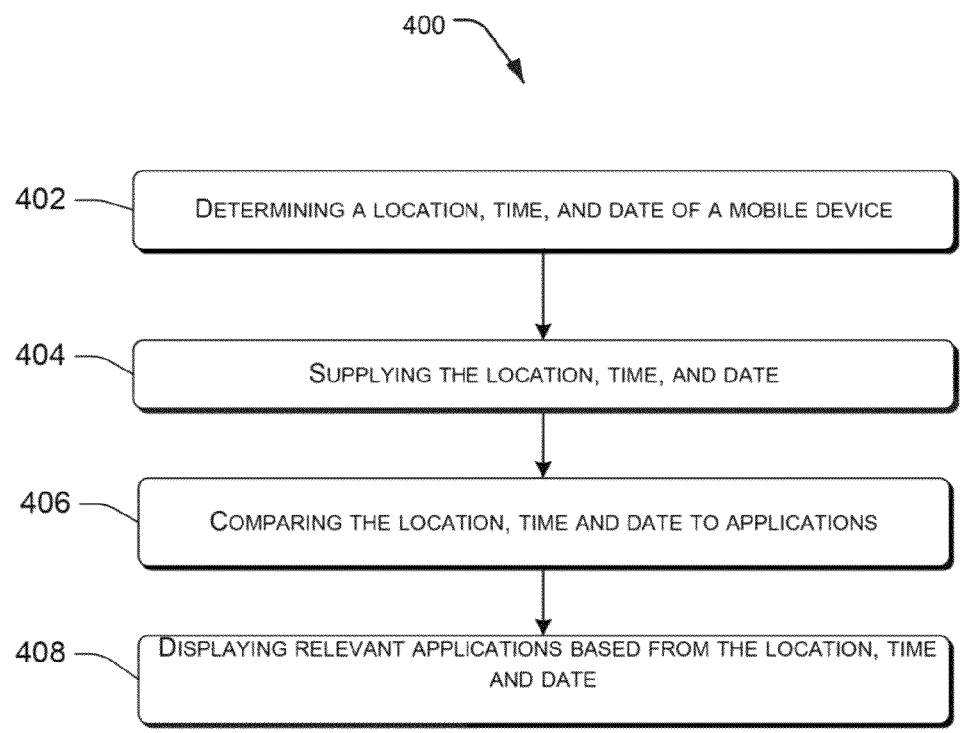
FIG. 4 is an example process to implement location-aware application recommendation.

FIG. 4 is a flow diagram illustrating example process 400 that implement the techniques described herein for location-based application recommendation. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, determining a location and associated time and date in a wireless device is performed. In an implementation, a physical location module (e.g., physical location module 302) may be configured to determine a specific location for the wireless device (e.g., wireless device 102). Furthermore, the time and date that are associated to the determination of the location is determined and stored by the physical location module 302. The location, time, and date may be supplied by the physical location module 302 to a location trending (e.g., location trending 304) that is configured to track and store number of times that a user of the wireless device 102 has been to a particular place.

At block 404, furthermore, the location, time, and date may be supplied by the physical location module 302 to a matching ruleset (e.g., matching ruleset 306 that may be configured to query a list of applications that may correspond to the location, time, and date inputs received from the physical location module 302). In an implementation, the matching ruleset 306 is further configured to receive from the location trending 304 the number of times that the user has been to the particular place (i.e., historical location information).

At block 406, comparing the location, time and date to at least one or more applications in an application location cache. In an implementation, an application location cache (e.g., application location cache 208) may be configured to initially store at least one or more applications that may be relevant to places where a particular user is likely to visit. In an implementation, the matching ruleset 306 may be configured to compare the at least one or more applications at the application location cache 208 to the location, time, and date data received from the physical location module 302. Furthermore, the matching ruleset 306 may be configured to compare the at least one or more applications at the application location cache 208 to the historical location information data received from the location trending module 304. In an implementation, the at least one or more applications in the application location cache 208 may be updated through a query (e.g., query 202) that may be initiated by a cache manager (e.g., cache manager 204). The query 202 may utilize a given user input (e.g., user sensitivity) in a user preference interface (e.g., user preference 308).

At block 408, displaying relevant applications is performed. In an implementation, the matching ruleset 306 may be configured to determine the at least one or more applications that are relevant to the current location, time, and date of the user. Further, the matching ruleset 306 may determine the applications that are relevant to the historical location information that is supplied by the location trending 304. Furthermore, the matching ruleset 306 may be configured to supply the relevant applications for display (e.g., application market place 112) at the wireless device 102.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional and Alternative Implementation Notes

Figure 5:
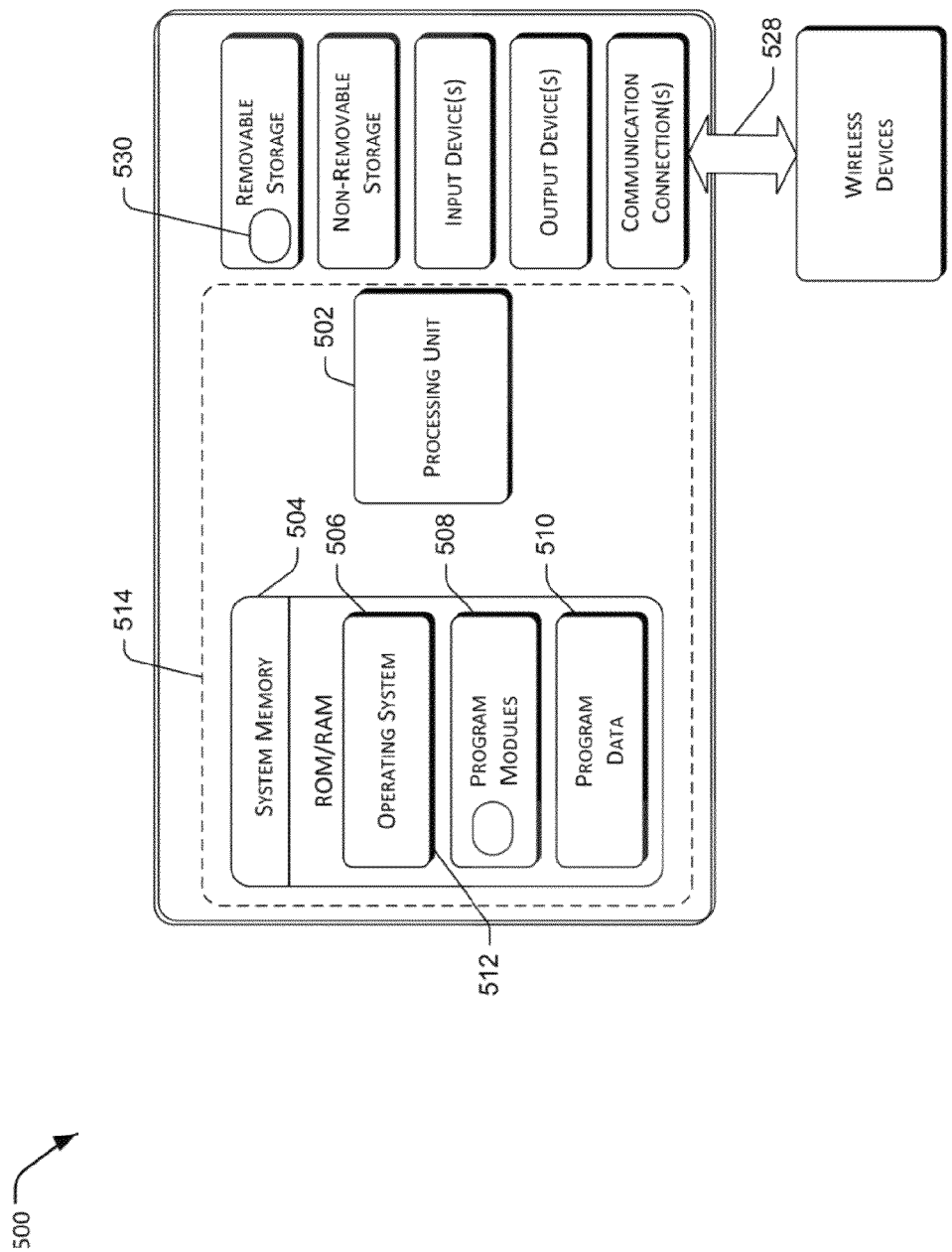
FIG. 5 is an example system that may be utilized to implement various described embodiments.

FIG. 5 is an example system that may be utilized to implement various described embodiments. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508 that implement the wireless device architecture 300, and may include program data 510. A basic implementation of the computing device 500 is demarcated by a dashed line 514.

The program module 508 may include a module 512 configured to implement the one-tap connection and synchronization scheme as described above. For example, the module 512 may carry out one or more of the method 400, and variations thereof, e.g., the computing device 500 acting as described above with respect to the wireless device 102.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" may refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices; or any other non-transitory medium that may be used to store information for access by a computing device, e.g., computing device 500 and wireless mobile device 102. Any of such computer accessible media may be part of the computing device 500.

In one implementation, the removable storage 516, which is a computer accessible medium, has a set of instructions 530 stored thereon. When executed by the processing unit 502, the set of instructions 530 cause the processing unit 502 to execute operations, tasks, functions and/or methods as described above, including method 400 and any variations thereof.

Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to communicate wirelessly with one or more other wireless devices, over wireless connection 528 based on near field communication (NFC), Wi-Fi, Bluetooth, radio frequency (RF), infrared, or a combination thereof.

It is appreciated that the illustrated computing device 500 is one example of a suitable device and is not intended to suggest any limitation as to the scope of use or functionality of the various embodiments described.

Unless the context indicates otherwise, the term "Universal Resource Identifier" as used herein includes any identifier, including a GUM, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or inure devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

The following examples pertain to further embodiments:

At least one computer accessible medium having instructions stored thereon for generating location-based application recommendations, the instructions when executed on a machine, cause the machine to: determine a current location, time, and date of corresponding a wireless device; compare the current location, time, and date to information stored in the wireless device with at least one or more applications; and display the at least one or more applications that are relevant to the current or historical location, time, and date of the wireless device.

Computer accessible medium wherein the determining includes tracking historical location information of the wireless device, the historical location information includes the number of times that the wireless device has been to the current location.

Computer accessible medium wherein the compare includes a matching ruleset module that is configured to compare the historical information location with the at least one or more applications stored in the wireless device.

Computer accessible medium wherein the compare includes a matching ruleset module that is configured to compare the current location, time, and date to the at least one or more applications stored in an application location cache of the wireless device.

Computer accessible medium further comprising causing the machine to trigger a recommendation alert that includes a notification for the at least one or more applications that are discovered to be relevant to the current location, time, and date of the wireless device.

Computer accessible medium wherein the recommendation is from an application store.

Computer accessible medium as further comprising causing the machine to query an update for an application location cache of the at least one or more applications that are relevant to relevant to a physical region where the user typically visits.

Computer accessible medium as recited further comprising causing the machine to adjust location privacy of the wireless device to limit cache of entries to an application location cache, the cache of entries includes the applications that are supplied by an application location service in response to a query from a cache manager.

Computer accessible medium as further comprising causing the machine to adjust user sensitivity of the wireless device to limit the applications to be displayed according to number of user visitations to the current location.

Computer accessible medium further comprising causing the machine to supply the current location, time, and date to a matching ruleset module that is configured to compare the current location, time, and date to the at least one or more applications in the wireless device.

Computer accessible medium further comprising causing the machine to interact by the wireless device with an application location service that is located in a cloud, the application location service stores the at least one or more applications that is supplied by independent software vendors (ISVs).

A wireless device comprising: one or more processors; a physical location module communicatively coupled to the one or more processors, that determines a current location, time and date associated with the wireless device; an application location cache communicatively coupled to the one or more processors, to store physical locations related to at least one or more applications; and matching ruleset logic communicatively coupled to the one or more processors configured to compare the current location, time, and date to the physical locations related to at least one or more applications, wherein the matching ruleset logic is configured to provide a user the list of at least one or more applications that are relevant to the current or historical location, time, and date of the wireless device.

Wireless device wherein the application location cache stores corresponding locations for the at least one or more applications.

Wireless device wherein the application location cache interacts with an application location service that is located in a cloud, the application location service is configured to store location information for the at least one or more applications that are supplied by independent software vendors (ISVs).

Wireless device wherein the matching ruleset logic is configured to receive the current location, time, date, and historical location information that includes the number of times that the wireless device has been to the current location.

Wireless device further comprising an application memory store that includes user interface to provide a one-click installation to allow the relevant application to be installed as part of recommendation.

Wireless device further comprising a recommendation alert that includes a notification for the at least one or more applications that are discovered to be relevant to the current location, time, date, and historical location information of the wireless device.

Wireless device further comprising a location trending module to determine the historical location information that includes tracking the number of times that a user has been to the current location, wherein the historical location information is utilized by the matching ruleset for comparison with the at least one or more applications to provide the relevant applications.

Wireless device further comprising a cache manager that updates the application location cache through querying of the at least one or more applications that are relevant to a physical region where the user typically roams.

Wireless device further comprising a user preference for adjusting location privacy of the wireless device to limit cache of entries to the application location cache, the cache of entries includes the applications that are supplied by an application location service in response to a query from a cache manager.

Wireless device further comprising a user preference for adjusting user sensitivity of the wireless device to limit the relevant applications to be supplied by the matching ruleset module based on a certain number of user visitations to the current location.

A method of generating location-based application recommendation comprising: determining a current location, time, and date associated with a wireless device; comparing the current location, time, and date to information stored in the wireless device about at least one or more applications; and displaying a recommendation for at least one or more applications that are relevant to current or historical location, time, and date of the wireless device.

Method wherein the determining includes tracking historical location information of the wireless device, the historical location information includes the number of times that the wireless device has been to the current location.

Method wherein the comparing includes a matching ruleset module that is configured to compare the historical information location with the at least one or more applications stored in the wireless device.

Method wherein the comparing includes comparing by a matching ruleset module that is configured to compare the current location, time, and date to the at least one or more applications stored in an application location cache of the wireless device.

Method further comprising triggering a recommendation alert that includes a notification for the at least one or more applications that are discovered to be relevant to the current location, time, and date of the wireless device.

Method further comprising triggering a recommendation alert that includes a notification for the at least one or more applications that are discovered to be relevant to places a user has been.

Method further comprising querying by a cache manager to update an application location cache of the at least one or more applications that are relevant to a physical region where a user of the wireless device typically visits.

Method further comprising adjusting location privacy of the wireless device to limit cache of entries to an application location cache, the cache of entries includes the applications that are supplied by an application location service in response to a query from a cache manager.

Method further comprising adjusting user sensitivity of the wireless device to limit the applications to be displayed according to number of user visitations to the current location.

Method further comprising supplying the current location, time, and date to a matching ruleset module for comparing the current location, time, and date to the at least one or more applications in the wireless device.

Method further comprising interacting by the wireless device with an application location service that is located in a cloud, the application location service to store the location information for at least one or more applications that is supplied by independent software vendors (ISVs).

What is claimed is:

1. At least one computer accessible medium having instructions stored thereon for generating location-based application recommendations, the instructions when executed on a machine, cause the machine to:
   determine a current location of a wireless device
   compare the determined current location to information stored in the wireless device that comprises at least one or more applications, wherein the comparing comprises adjusting user sensitivity that limits the at least one or more applications to be displayed based on user visitations to the current location; and
   display the at least one or more applications that are relevant to the current location of the wireless device.

2. The computer accessible medium as recited in claim 1, wherein the determining includes tracking historical location information of the wireless device, the historical location information includes the number of times that the wireless device has been to the current location.

3. The computer accessible medium as recited in claim 1, wherein the compare includes a matching ruleset module that is configured to compare historical location information with the at least one or more applications stored in the wireless device.

4. The computer accessible medium as recited in claim 1, wherein the compare includes a matching ruleset module that is configured to compare the current location, time, and date to the at least one or more applications stored in an application location cache of the wireless device.

5. The computer accessible medium as recited in claim 1, further comprising causing the machine to trigger a recommendation alert that includes a notification for the at least one or more applications that are discovered to be relevant to the current location, time, and date of the wireless device.

6. The computer accessible medium as recited in claim 1, wherein the location-based application recommendation is from an application store.

7. The computer accessible medium as recited in claim 1, further comprising causing the machine to query an update for an application location cache of the at least one or more applications that are relevant to relevant to a physical region where a user typically visits.

8. The computer accessible medium as recited in claim 1, further comprising causing the machine to adjust location privacy of the wireless device to limit cache of entries to an application location cache, the cache of entries includes the applications that are supplied by an application location service in response to a query from a cache manager.

9. The computer accessible medium as recited in claim 1, further comprising causing the machine to supply the current location, time, and date to a matching ruleset module that is configured to compare the current location, time, and date to the at least one or more applications in the wireless device.

10. A computer accessible medium as recited in claim 1, further comprising causing the machine to interact by the wireless device with an application location service that is located in a cloud, the application location service stores the at least one or more applications that is supplied by independent software vendors (ISVs).

11. A wireless device comprising:
   one or more processors;
   a physical location module communicatively coupled to the one or more processors, that determines a current location, time and date associated with the wireless device;
   an application location cache communicatively coupled to the one or more processors, to store physical locations related to at least one or more applications; and
   matching ruleset logic communicatively coupled to the one or more processors configured to compare the current location, time, and date to the physical locations related to at least one or more applications, wherein the matching ruleset logic is configured to provide a user the list of at least one or more applications that are relevant to the current or historical location, time, and date of the wireless device, wherein an adjustment of a user sensitivity limits the at least one or more applications to be displayed based on user visitations to the current location.

12. The wireless device as recited in claim 11, wherein the application location cache stores corresponding locations for the at least one or more applications.

13. The wireless device as recited in claim 11, wherein the application location cache interacts with an application location service that is located in a cloud, the application location service is configured to store location information for the at least one or more applications that are supplied by independent software vendors (ISVs).

14. The wireless device as recited in claim 11, wherein the matching ruleset logic is configured to receive the current location, time, date, and historical location information that includes the number of times that the wireless device has been to the current location.

15. The wireless device as recited in claim 11, further comprising an application memory store that includes a user interface to provide a one-click installation to allow the relevant application to be installed as part of recommendation.

16. The wireless device as recited in claim 11, further comprising a recommendation alert that includes a notification for the at least one or more applications that are discovered to be relevant to the current location, time, date, and historical location information of the wireless device.

17. The wireless device as recited in claim 11, further comprising a location trending module to determine the historical location information that includes tracking the number of times that a user has been to the current location, wherein the historical location information is utilized by the matching ruleset for comparison with the at least one or more applications to provide the relevant applications.

18. The wireless device as recited in claim 11, further comprising a cache manager that updates the application location cache through querying of the at least one or more applications that are relevant to a physical region where the user typically roams.

19. The wireless device as recited in claim 11, further comprising a user preference for adjusting location privacy of the wireless device to limit cache of entries to the application location cache, the cache of entries includes the applications that are supplied by an application location service in response to a query from a cache manager.

20. The wireless device as recited in claim 11, further comprising a user preference configured to utilize the adjusted user sensitivity of the wireless device to limit the relevant applications to be supplied by the matching ruleset module based on a certain number of user visitations to the current location.

21. A method of generating location-based application recommendation comprising:
   determining a current location of a wireless device;
   comparing the current location to information stored in the wireless device that comprises at least one or more applications, wherein the comparing comprises adjusting of a user sensitivity that limits the at least one or more applications to be displayed based on user visitations to the current location; and
   displaying a recommendation for at least one or more applications that are relevant to current or historical location of the wireless device.

22. The method as recited in claim 21, wherein the determining includes tracking historical location information of the wireless device, the historical location information includes the number of times that the wireless device has been to the current location.

23. The method as recited in claim 21, wherein the comparing includes a matching ruleset module that is configured to compare a historical information location with the at least one or more applications stored in the wireless device.

24. The method as recited in claim 21, wherein the comparing includes comparing by a matching ruleset module that is configured to compare the current location, time, and date to the at least one or more applications stored in an application location cache of the wireless device.

25. The method as recited in claim 21, further comprising triggering a recommendation alert that includes a notification for the at least one or more applications that are discovered to be relevant to the current location, time, and date of the wireless device.

26. The method as recited in claim 21, further comprising triggering a recommendation alert that includes a notification for the at least one or more applications that are discovered to be relevant to places a user has been.

27. The method as recited in claim 21, further comprising querying by a cache manager to update an application location cache of the at least one or more applications that are relevant to a physical region where a user of the wireless device typically visits.

28. The method as recited in claim 21, further comprising adjusting location privacy of the wireless device to limit cache of entries to an application location cache, the cache of entries includes the applications that are supplied by an application location service in response to a query from a cache manager.

29. The method as recited in claim 21, further comprising supplying the current location, time, and date to a matching ruleset module for comparing the current location, time, and date to the at least one or more applications in the wireless device.

30. The method as recited in claim 1, further comprising interacting by the wireless device with an application location service that is located in a cloud, the application location service to store the location information for at least one or more applications that is supplied by independent software vendors (ISVs).

* * * * *